UNITED STATES PATENT OFFICE.

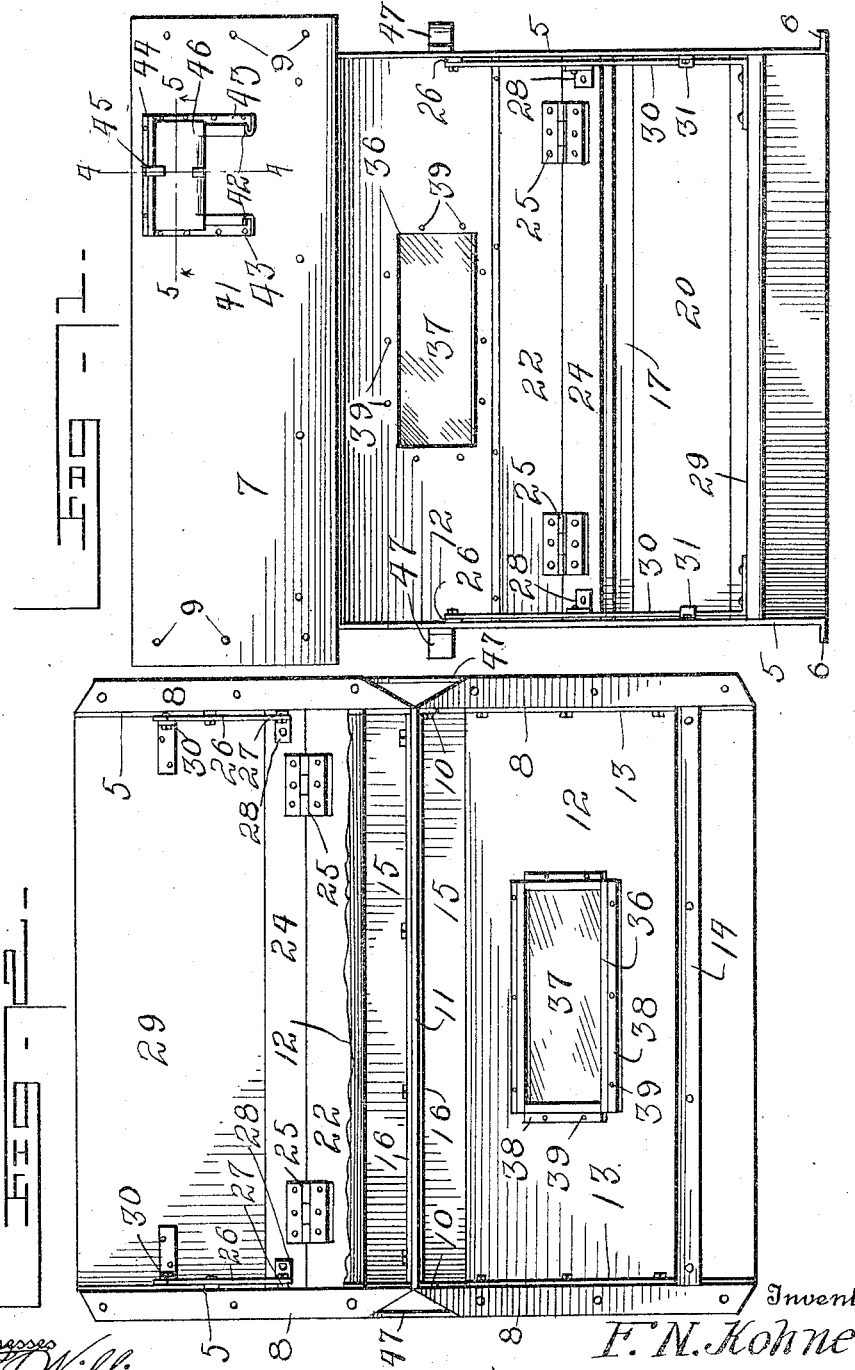

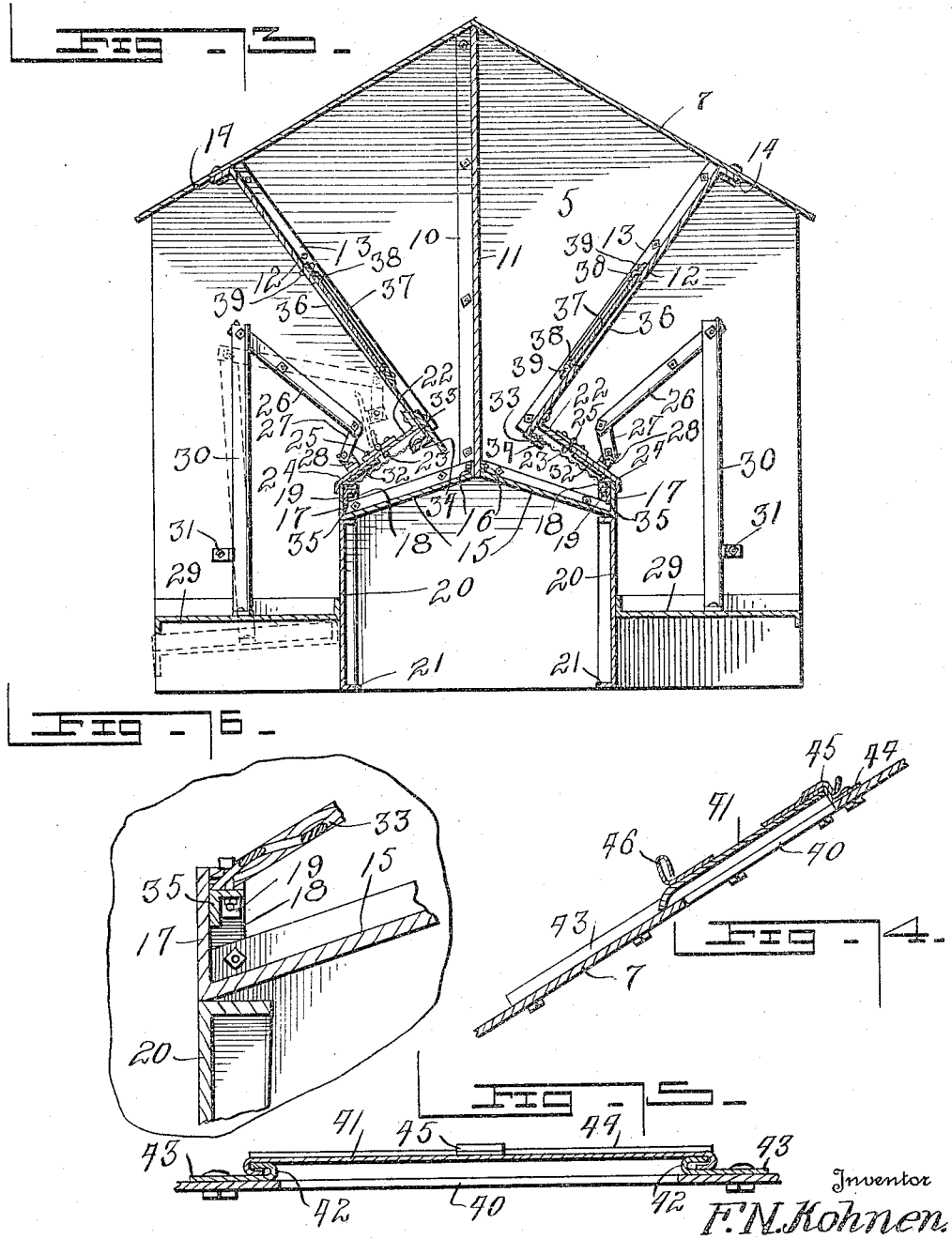

FRANKLYN N. KOHNEN, OF BLASDELL, NEW YORK.

FOOD-HOPPER.

1,209,853.  Specification of Letters Patent.  Patented Dec. 26, 1916.

Application filed October 28, 1913. Serial No. 797,889.

*To all whom it may concern:*

Be it known that I, FRANKLYN N. KOH-NEN, a citizen of the United States, residing at Blasdell, in the county of Erie, State of New York, have invented certain new and useful Improvements in Food-Hoppers; and I do hereby declare the following to be a full, clear, and exact description of the invention, such as will enable others skilled in the art to which it appertains to make and use the same.

This invention relates to new and useful improvements in feed troughs having automatically operated means associated therewith for covering the same.

The object of the present invention resides in the provision of a feed trough for chickens or other fowls which is provided with means normally covering the trough and actuated upon the approach of a fowl to the trough, to an uncovering position, the invention specifically residing in the provision of such a structure which cannot be operated by small birds and which is provided with means whereby such animals as rodents are prevented from reaching the food.

A further object of the invention resides in the provision of a compact structure including the above troughs and hoppers associated therewith and means whereby the food is at all times visible to the fowl so that he is naturally attracted to the trough.

With these and other objects in view, the invention resides in the novel combination, formation and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a side elevational view of the improved hopper, Fig. 2 is a top plan view thereof with the cover removed and a portion of the hopper structure broken away, Fig. 3 is a central vertical sectional view, Fig. 4 is a sectional view on the line 4—4 of Fig. 1, Fig. 5 is a sectional view on the line 5—5 of Fig. 1, Fig. 6 is a detail sectional view showing the means for supporting the screen holding strip.

Referring now more particularly to the accompanying drawings, the structure is shown as comprising two end walls 5, which are preferably formed of galvanized iron or other suitable sheet metal and which have their lower end portions laterally directed to form foot flanges 6. The sides of the top portion are cut away to seat the angular roof and are provided with lateral flanges 8 through which are passed bolts 9 engaging the roof to form a securing means therefor.

Secured to the wall members 5 by lateral flanges 10 at the sides thereof is a central partition wall 11 which extends from the roof downwardly substantially two-thirds of the height of the side members. Secured also to the wall members at each side of the central partition wall are plates 12 converging toward and spaced from the partition wall at its lower end. These plates are secured to the walls by the lateral flanges 13 and the plates are provided at their top edge portions with lateral flanges 14 forming a support and a securing means for the roof. Thus it is seen that there are provided two hoppers.

A trough is provided for each hopper comprising a sheet of material 15, having at one side a lateral flange 16 bolted to the lower end of the partition wall and extending downwardly and outwardly with its ends secured similarly to the walls 5. The free side of the sheet of material 15 is directed upwardly to form the outer side 17 of the hopper and this side 17 has its ends directed laterally at 18 and secured to the sides 5 by bolts 19 which in addition to this normal function serve also a function hereinafter brought out.

To provide a support for the outer portion of the hopper and also to close the sides of the structure, plates 20 are secured to the troughs and to the side members and extend to the ground, terminating in foot flanges 21.

The cover for each hopper comprises a plate 22 secured to the lower portion of each hopper plate 12 and extending outwardly in parallel relation to the bottom of the adjacent trough and terminating in a downward extension 23. Movable covers 24 are hinged at 25 to the free sides of the plates 22.

The means for swinging one of the covers open when a fowl approaches the adjacent trough comprising a lever 26 pivoted intermediate of its ends to each side member and connected to the adjacent end of the cover by a link 27 pivotally secured to an ear 28 on the cover. A movable platform 29 is provided and has bolted to each end thereof a vertical link 30 pivotally secured to the free end of the adjacent lever 26. To prevent outward swinging movement of the platform and links 30 a suitable stop member 31 is provided comprising a strip of metal bolted to each side member and having one end inwardly bent to engage the side of the link. The platform is held against inward swinging movement by engagement with the plate 20 and thus is permitted only a substantially vertical movement.

When a fowl steps on the platform, it actuates the levers to raise the cover. It is noted that the platform is sufficient distance below the mouth of the feed trough to allow only the fowls of sufficient size to reach the same when standing on the platform. The under face of the pivoted cover 24 is provided with weights 32 to assist the cover 24 in assuming a closed position when the fowl steps off of the platform.

To prevent animals, such as rodents, from reaching the food, a strip of screen material 33 is provided for each trough. To hold this material in place over the trough the lower end of the hopper side 12 is extended below the plate 22 and provided with an outward flange 34 seating one side of the screen strip and the other side of the screen strip is bolted to one side portion of an angular strip 35 which is held adjacent the upper portion of the outer side 17 of the hopper by the insertion of its other side between the said side 17 and the bolts 19 aforedescribed. The screen material is of such mesh that the fowls can readily peck therethrough.

Each hopper plate 12 is provided with a rectangular opening 36 over which is placed a piece of glass 37 held in place by the strips 38 having their outer portions offset and bolted at 39 to the said plates. Thus a fowl will see the food through the window thus formed and will be attracted toward the device and will step on the platform. The cover then rises and the fowl notices the food in the trough.

Food is placed in the hoppers through rectangular openings 40 in the roof. These openings are normally closed by covers 41 having their sides bent in substantially U-shaped cross section and slidably engaging similar portions 42 of track plates 43 secured at the sides of the openings. A weather strip 44 is bolted at the top portion of each opening and has an outwardly offset portion adapted to be disposed over the cover 41 when it is covering the opening, a spring finger 45 being secured on the cover and engaging the offset portion formed by the weather strip to hold the cover in said position. A suitable knob or other handle member 46 is secured to each cover to facilitate moving the same.

For transporting the structure, handles 47 are secured to each of the sides 5.

From the foregoing it is seen that a very simple and efficient structure has been provided.

It is noted that there is no chance for any tilting movement of the tilting platform to tend to throw a fowl off its feet.

By the provision of the two hoppers, two different kinds of food may be fed to the fowls.

What is claimed is:

A feeding device comprising a roof and side walls, a central partition wall secured thereto and terminating short of the bottoms thereof, a hopper wall on each side of the central partition wall converging toward and terminating short of the lower edge thereof, outwardly and downwardly extending plates secured to the lower edge of the central partition and to the side walls and having their outer sides upwardly directed to form troughs, hinged covers for each of said troughs, screens arranged over each trough beneath the cover, supporting plates arranged beneath the outer edges of the troughs, bodily depressible platforms arranged between the said plates and the outer edges of the side walls, and means including a guiding element fixed to the platform for connecting each platform to the hinged covers for the purpose set forth.

In testimony whereof, I affix my signature, in the presence of two witnesses.

FRANKLYN N. KOHNEN.

Witnesses:
IDA M. KOHNEN,
W. J. HENDERSON.

Copies of this patent may be obtained for five cents each, by addressing the "Commissioner of Patents, Washington, D. C."